United States Patent Office 3,250,283
Patented May 10, 1966

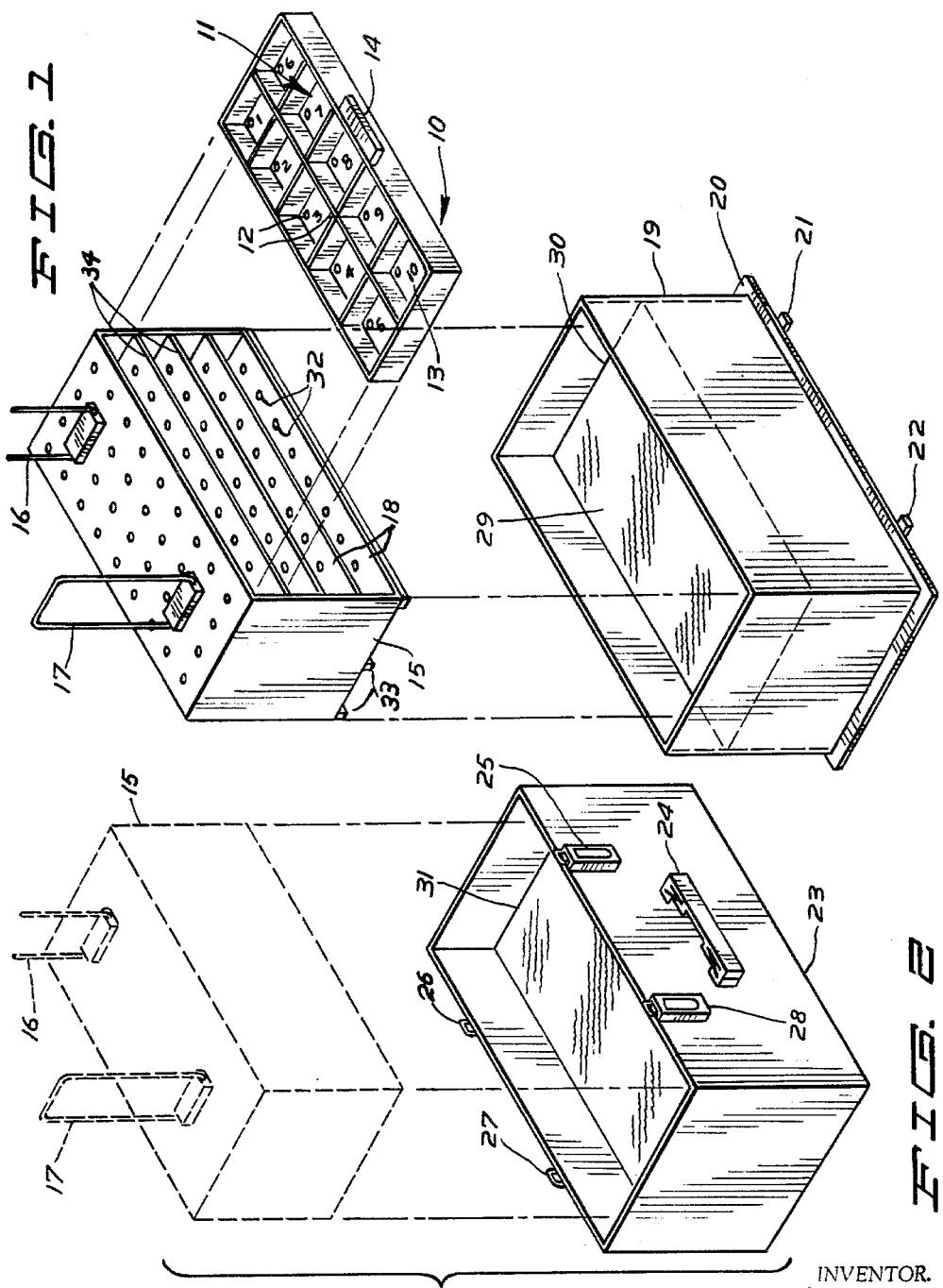

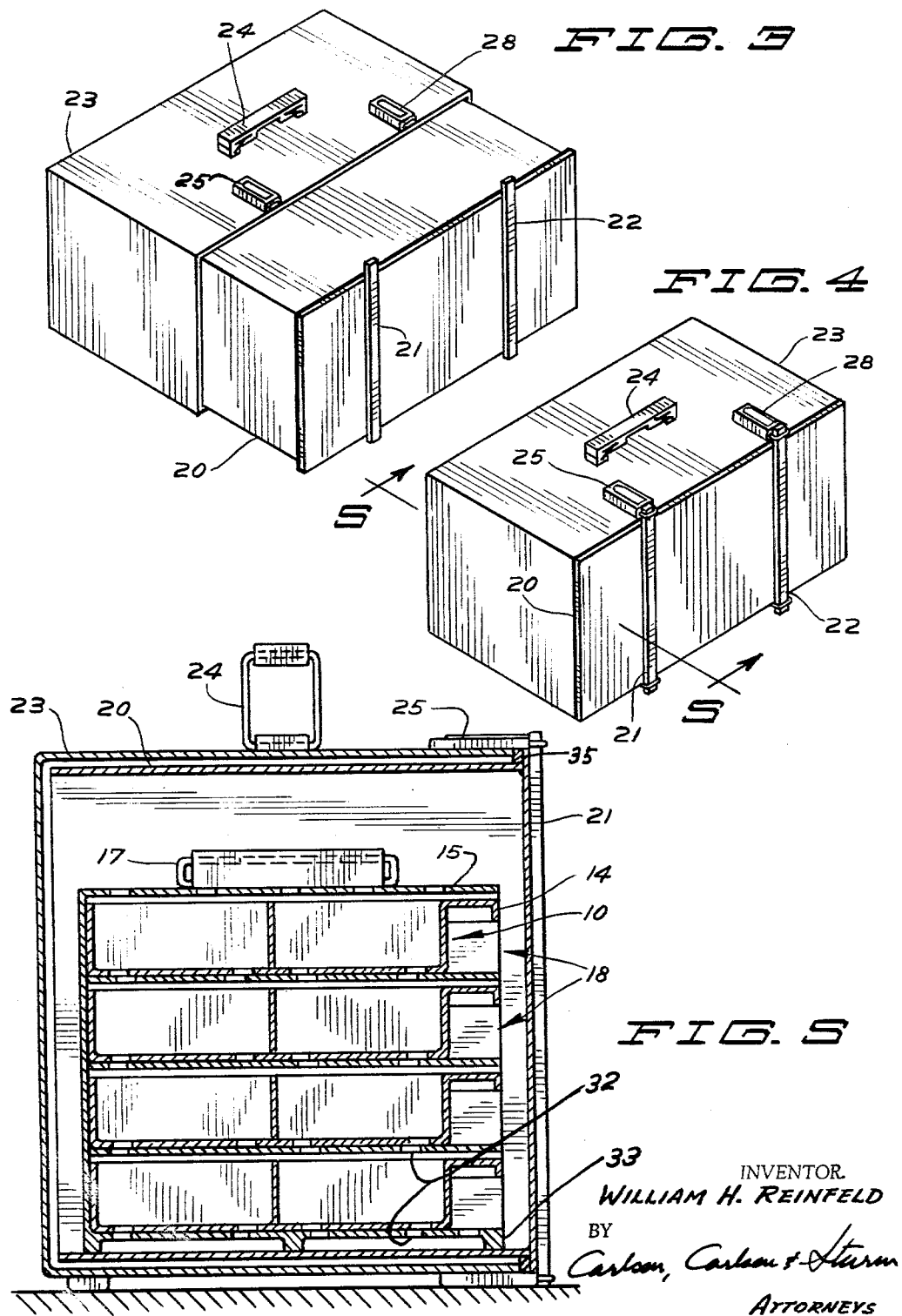

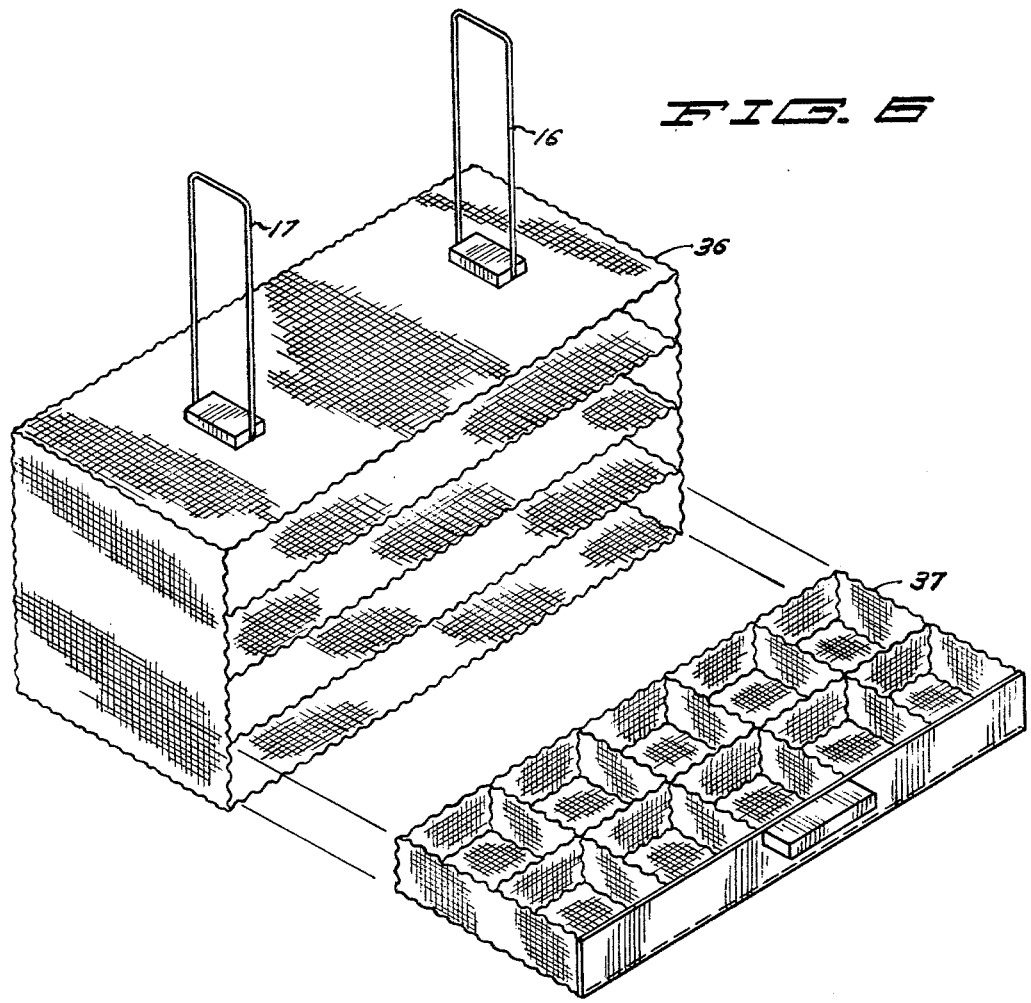

3,250,283
ARTICLE HANDLING AND CLEANING
APPARATUS
William H. Reinfeld, 11521 Olive St.,
Coon Rapids, Minn.
Filed June 26, 1964, Ser. No. 378,234
12 Claims. (Cl. 134—92)

This invention relates generally to article handling apparatus and is more particularly directed to apparatus for cleansing, storing and transporting articles to be used by a plurality of individuals.

There are a number of activities in which a plurality of individuals may participate which require the use of various articles for safety or health reasons. One example of such an activity is organized football games which, regardless of the level of achievement of the individuals, requires the use of protective devices such as plastic mouthpieces to prevent damage to the teeth of individuals particpiating in the contest. The advent of the use of such equipment and apparatus for health and safety reasons has increased the responsibilities of the administrators of such activities in providing adequate cleansing, storage and transportation of the equipment used by the individuals engaged in such activities. As will become apparent from a consideration of the detailed description of my invention which will be set forth below, I have provided an improved novel and useful apparatus for efficiently handling the various articles that may be used by individual participants in such activities.

Briefly, my invention is comprised of a plurality of trays having individual compartments, which may be marked with suitable indicia to enable identification of the articles for individuals; a rack, adapted to coact with and receive the trays containing the articles for cleansing, storing and transporting the articles; a cleansing tank adapted to receive the rack for cleansing purposes and for storage purposes; and a storage case which also functions as a rinsing tank and which is adapted to receive the rack and trays containing the articles for cleansing purposes and which is adapted to receive the tank, rack and trays for storage and transportation purposes.

It is therefore an object of my invention to provide an improved article handling apparatus for cleansing, storing and transporting articles.

It is a further object of my invention to provide an improved apparatus for cleansing articles which provides an increased efficiency of operation.

A still further object of my invention is to provide an improved apparatus for cleansing, storing and transporting articles in which individual articles may be easily identified.

Another object of my invention is to provide an improved article cleansing, storing and transporting apparatus which is highly resistant to normal and abnormal conditions of use while adequately protecting the articles contained therein from undesirable environmental conditions.

These and other objects of my invention will become apparent from a consideration of the appended specification, claims and drawing, in which—

FIGS. 1 and 2 are isometric composite sketches of the several elements of which my invention is comprised showing them in operative relationship;

FIG. 3 is an isometric sketch of the apparatus of my invention in a partly assembled state;

FIG. 4 illustrates a completely assembled cleansing, storing and transporting apparatus according to the principles of my invention;

FIG. 5 is a sectional view of the apparatus shown in FIG. 4 taken along section lines 5—5; and FIG. 6 is an isometric sketch of a further embodiment of my invention.

Referring now to FIGS. 1, 2 and 5 of the drawings, the various elements of which my invention is comprised are shown generally as a tray 10, a rack 15, a tank 19 and a case 23, each of which are adapted to be assembled in the manner shown in FIGS. 1 and 2 and in FIG. 5 to provide for the complete cleansing, storage and transportation for articles to be received in the several compartments provided in each of the tray members 10.

Tray member 10 is shown comprised of a plurality of compartments 11, each of which is open at its top end for receiving individual articles to be cleansed, stored or transported from one location to another. Each of the individual compartments 11 is shown provided with a plurality of perforations 12 to allow the free flow of fluid therethrough for cleansing and rinsing purposes of articles contained therein. It may further be noted that each of the compartments 11 may be provided with suitable indicia (shown in the form of numerals) in order to readily identify the several articles which may be contained within each of the tray members 10. It may further be noted that each of the plurality of tray members 10 that may be utilized in connection with my invention may also be provided with further indicia, in the form of appropriate numerals, letters or color, to provide for further identification of the individual articles to be contained therein. Each of the tray members 10 is also provided with a suitable handle 14, to allow for ease of insertion and withdrawal from the several compartments provided within rack 15, to be described below. It may be noted that the tray members 10 may be comprised of suitable plastic metallic or combination material which, as will become apparent to those skilled in the art, must be resistant to the solutions utilized to cleanse and rinse the articles which may be placed therein.

Rack 15 is of generally rectangular shape and is shown in FIG. 1 as having one side open and having a plurality of horizontally disposed shelf, or partition members 34. The top, bottom and each of the partition members 34 are provided with a plurality of perforations 32 to allow for the free flow of fluid through the interior of rack 15 when it is immersed in such fluid. Perforations 32 may be oriented to provide registration with the perforations described above in the bottom of compartments 11 in tray member 10. Partition members 34 serve to define a plurality of tray receiving compartments 18 in rack 15 which are dimensioned to slidably receive tray members 10 for cleansing, storing and transporting tray members 10 and any articles contained therein. Rack member 15 is also provided with a pair of handles 16 and 17 attached to the top surface thereof to facilitate handling by an operator in the several operations which may be performed with the apparatus of my invention.

The preferred embodiment of tray members 10 and rack 15 is shown as comprised of a perforated material. It is anticipated that other modifications of the configuration of these members, for example, woven plastic or metallic material, will occur to those skilled in the art upon becoming familiar with the principles of my invention.

Referring to FIG. 6, a further embodiment of my invention is shown comprised of a rack 36, including handles 16 and 17, comprised of woven material and including a plurality of shelves in parallel relationship as illustrated above. FIG. 6 also shows one of several tray members 37, also comprised of woven material and including a plurality of compartments for receiving articles to be disposed therein.

Tank 19 is of generally rectangular shape, as illustrated in FIG. 1 and is open at its upper end and is suitably dimensioned to receive rack 15 in the attitude illustrated in FIG. 1 which may be considered a first position and in the attitude illustrated in FIG. 5 which may be considered a second position of rack 15 with respect to tank 19. Tank 19 is further shown provided with a laterally extending bottom lip portion 20 for purposes to be explained below, a line 30 to indicate to the operator the necessary level for fluid to be placed therein for a cleansing or rinsing operation and a pair of laterally extending bar members 21 and 22 provided to support tank 19 and to provide a means for attaching tank 19 to case 23, as will be described below. A suitable resilient gasket member 35, illustrated on FIG. 5, may be attached to the upwardly extending portion of laterally extending bottom lip portion 20 of tank 19 as shown on FIG. 1 for providing a seal when the apparatus is completely assembled as shown in FIGS. 4 and 5. Tank 19 may be constructed of suitable material as noted to provide the desired characteristics of retaining a quantity of fluid and resistance to normal and abnormal environmental conditions which may be encountered in transporting the apparatus from one location to another.

Case 23 is shown, in FIG. 2, as comprising a generally rectangular member that is open at its top end. A plurality of fastening devices, adapted to coact with the laterally extending portions of members 21 and 22 on tank 19, are shown positioned in operative relationship therewith around the top periphery of the two sides of case 23 and are indicated by reference characters 25, 26, 27 and 28. These fastening members may be comprised of any suitable means for securely holding tank 19 within case 23 in the relationship shown in FIG. 5. Case 23 is also shown provided with a suitable handle 24 disposed on one of the sides thereof for engagement by the hand of a user and is normally used in the relationship shown in the sectional view of FIG. 5 for transporting the entire apparatus from one location to another. Case 23 is also shown with a suitable line 31 for indicating to an operator the depth to which fluid must be added for use in the cleansing and/or rinsing operation involving rack 15 and tray members 10 and the assembly may be inserted from the position shown in dotted outline on FIG. 2 for performing this function. Case 23 may be comprised of suitable material as noted above to provide the desirable resistance to environmental conditions involved in its use in cleansing, storing and transporting articles from one location to another.

As may be seen from the drawing, the several members of which my invention is comprised, are suitably dimensioned for disposition in the telescoped interfitting relationship shown in the sectional view of FIG. 5. Tray members 10 are suitably dimensioned to be slidably received by compartments 18 in rack 15. Trays 10 may also be suitably dimensioned with respect to the tray receiving compartments found in rack 15 whereby articles contained in compartments 11 will be securely and effectively confined to their individual compartments which may, as noted above, be provided with suitable indicia to identify the individual articles contained in the compartments. In like manner, rack 15 may be disposed within tank 19 in either of the two positions shown in FIG. 1 and FIG. 5 for cleansing, storage and transporting of the articles contained in tray members 10 slidably disposed therein. In a similar manner, tank 19 is suitably dimensioned to be slidably disposed within case 23 whereby bar members 21 and 22 may be engaged by fasteners 25, 26, 27 and 28 to provide a sealed, secure transporting assembly. Gasket 35, which may be comprised of suitable resilient material, is dimensioned and disposed to engage the upward facing edges of the top open end of case 23 to provide a suitable seal for the apparatus to ensure the sanitary condition of the articles in tray members 10 during storage and transportation of the articles in the assembly.

In use, articles, for example mouthpieces for football or hockey players, are placed in their corresponding identifying compartments in tray members 10. Tray members 10 are slidably inserted into compartments 18 in rack 15. Tank 19 is filled to the line 30 with a suitable cleansing fluid, indicated by reference character 29, and rack 15, containing tray members 10 and the individual articles to be cleansed, is immersed in the fluid 29 in tank 19 and may be suitably agitated. During this portion of operation of my apparatus, foreign particles which may be present on the articles in compartments 11 in tray members 10 may be carried out through perforations 12 in tray members 10 and perforations 32 in the several compartments of rack 15 and into tank 19. Following the initial step, case 23 may be filled to the level indicated by reference numeral 31 with a suitable rinsing fluid and the operation completed. Thereafter, rack 15 may be placed in an air-drying environment or, the apparatus may be assembled as indicated in FIGS. 3, 4 and 5 and the articles contained therein may be stored until the next time their use is required.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Apparatus of the class above described comprising in combination:
   (a) a rectangular case having an open top;
   (b) a rectangular tank including sealing means adapted to sealingly engage said case having an open top and being dimensioned to be slidably received inside of said case;
   (c) a rectangular rack comprised of material exhibiting fluid transfer characteristics and having an open side and a plurality of shelf members disposed parallel to the top and bottom of said rack, said rack being dimensioned to be slidably received in said tank in first and second positions; and
   (d) a plurality of article receiving trays comprised of material exhibiting fluid transfer characteristics, each of said trays having a plurality of article receiving compartments and being dimensioned to be slidably received in said rack.

2. Apparatus of the class above described comprising in combination:
   (a) a rectangular case having an open top;
   (b) a rectangular tank having an open top and being dimensioned to be slidably received inside of said case, said tank having a laterally extending lip portion at the bottom edge thereof, said lip being dimensioned to sealingly engage the top of said case;
   (c) a rectangular rack having an open side and a plurality of shelf members disposed parallel to the top and bottom of said rack, said rack being dimensioned to be slidably received in said tank in first and second positions and said top, bottom and shelf members having a plurality of perforations therein; and
   (d) a plurality of article receiving trays, each of said trays having a plurality of article receiving compartments, being dimensioned to be slidably received in said rack and having a plurality of perforations in the bottom of said compartments.

3. The apparatus of claim 2 in which the perforations in the rack and the perforations in the trays are disposed to provide fluid transmitting cooperative registration when the trays are placed in the rack.

4. The apparatus of claim 2 in which the laterally extending lip portion on the tank includes a resilient sealing member adapted to sealingly engage the top of the case.

5. The apparatus of claim 3 in which the shelf members in said rack are so dimensioned and disposed therein so that articles in the compartments of the trays are confined therein.

6. The apparatus of claim 5 in which the compartments in the trays include indicia for identification of the articles placed therein.

7. The apparatus of claim 6 in which each of the trays includes indicia related to the indicia on the compartments.

8. Apparatus of the class above described comprising in combination;
   (a) a rectangular case having an open top and a plurality of fastening means disposed adjacent the top sides thereof;
   (b) a rectangular tank having an open top and being dimensioned to be slidably received inside of said case, said tank having laterally extending supporting bars disposed on the bottom surface therefore, said bars being disposed to be engaged by the fastening means on said case;
   (c) a rectangular rack having fluid transmitting perforations and having an open side and a plurality of shelf members disposed parallel to the top and bottom of said rack; said rack being dimensioned to be slidably received in said tank in first and second positions; and
   (d) a plurality of article receiving trays having fluid transmitting perforations, each of said trays having a plurality of article receiving compartments and being dimensioned to be slidably received in said rack.

9. The apparatus of claim 8 in which a carrying handle is disposed on one side of said case, said handle being oriented so that the top of the rack is disposed upwardly when the case is being transported.

10. Apparatus of the class above described comprising in combination;
    (a) a rectangular case having an open top;
    (b) a rectangular tank having an open top and being dimensioned to be slidably received inside of said case;
    (c) a rectangular rack having an open side and a plurality of shelf members disposed parallel to the top and bottom of said rack; said rack being dimensioned to be slidably received in said tank in first and second positions;
    (d) a plurality of article receiving trays, each of said trays having a plurality of article receiving compartments and being dimensioned to be slidably received in said rack; and
    (e) the top, bottom and shelf members of said rack and the bottom portions of said compartments in said trays having a plurality of perforations disposed for cooperative fluid transmitting registration when said trays are received in said rack, said perforations being dimensioned to allow the passage of foreign matter when said rack is immersed in a fluid for cleansing articles in said trays.

11. The apparatus of claim 8 in which the rectangular rack and the article receiving trays are comprised of material adapted to allow the circulation of fluid therethrough.

12. The apparatus of claim 8 in which the rectangular rack and the article receiving trays are comprised of woven material.

References Cited by the Examiner

UNITED STATES PATENTS

| | | | |
|---|---|---|---|
| 878,010 | 2/1908 | Merrell | 134—137 X |
| 1,227,860 | 5/1917 | Tuell | 21—83 |
| 1,592,709 | 7/1926 | Schwartz | 134—92 |
| 2,973,289 | 2/1961 | Cropp et al. | 134—86 X |

CHARLES A. WILLMUTH, *Primary Examiner.*

ROBERT L. BLEUTGE, *Assistant Examiner.*